US008181880B2

(12) United States Patent  (10) Patent No.: US 8,181,880 B2
Kwon et al.  (45) Date of Patent: May 22, 2012

(54) COMBI-CARD AND METHOD FOR MAKING THE SAME

(75) Inventors: Sang-Chel Kwon, Daejeon (KR); Jin-Ho Ryu, Daejeon (KR); Jong-Hoon Chae, Daejeon (KR); Jin-Ki Hong, Gyeongsanbuk-do (KR)

(73) Assignee: Korea Minting & Security Printing Corporation, Deajeon (KR)

( * ) Notice: Subject to any disclaimer, the term of this patent is extended or adjusted under 35 U.S.C. 154(b) by 352 days.

(21) Appl. No.: 11/629,639

(22) PCT Filed: Jun. 15, 2005

(86) PCT No.: PCT/KR2005/001828
§ 371 (c)(1),
(2), (4) Date: Mar. 30, 2009

(87) PCT Pub. No.: WO2005/124672
PCT Pub. Date: Dec. 29, 2005

(65) Prior Publication Data
US 2009/0200382 A1  Aug. 13, 2009

(30) Foreign Application Priority Data
Jun. 16, 2004 (KR) .................. 10-2004-0044655

(51) Int. Cl.
*G06K 19/06* (2006.01)
(52) U.S. Cl. ......... 235/492; 235/487; 438/106; 438/119
(58) Field of Classification Search .................. 235/487, 235/492; 438/106, 119
See application file for complete search history.

(56) References Cited

U.S. PATENT DOCUMENTS

| 5,545,589 | A  | * | 8/1996 | Tomura et al. ................ 438/119 |
| 5,888,624 | A  | * | 3/1999 | Haghiri et al. ............. 428/195.1 |
| 6,250,554 | B1 | * | 6/2001 | Leo et al. ....................... 235/487 |
| 6,459,588 | B1 | * | 10/2002 | Morizumi et al. ............ 361/737 |
| 6,518,097 | B1 | * | 2/2003 | Yim et al. ..................... 438/119 |
| 6,562,454 | B2 | * | 5/2003 | Takahashi et al. ............ 428/354 |
| 6,569,508 | B2 | * | 5/2003 | Babb et al. ................... 428/40.1 |
| 7,159,785 | B2 | * | 1/2007 | Yamanaka et al. ............ 235/492 |
| 7,253,024 | B2 | * | 8/2007 | Yu et al. ........................ 438/107 |
| 7,268,687 | B2 | * | 9/2007 | Egbert et al. ............... 340/572.7 |
| 2001/0013661 | A1 | * | 8/2001 | Yamaguchi et al. .......... 257/778 |
| 2001/0014377 | A1 | * | 8/2001 | Babb et al. ................... 428/40.1 |

(Continued)

FOREIGN PATENT DOCUMENTS

| JP | 2001-5934 | 1/2001 |
| JP | 2003-141486 | 5/2003 |

*Primary Examiner* — Ali Sharifzada
(74) *Attorney, Agent, or Firm* — Michael Best & Friedrich LLP

(57) ABSTRACT

The present invention relates to a combi-card which can be used in a contact-type or noncontact-type fashion and a method for manufacturing the same. More particularly, this invention relates to a combi-card and a method for making the same, in which an inlay layer on which an antenna terminal made of a coil or conductive fiber is formed and a COB (chip on board) on which ACF (anisotropic conductor film) is applied, are pre-treated by a heating head and the like, the COB is attached to an antenna coil insertion layer, and an upper printing sheet with a protection film, and a lower printing sheet with a protection film, which are cut out to be suitable for the COB shape, are stacked to construct a combi-card.

1 Claim, 9 Drawing Sheets

U.S. PATENT DOCUMENTS

2002/0170974 A1* 11/2002 Kashima ................. 235/492
2003/0029921 A1* 2/2003 Akita et al. ................. 235/492
2003/0062420 A1* 4/2003 Ohta et al. ................. 235/492
2005/0040243 A1* 2/2005 Bi et al. ................. 235/492

* cited by examiner

COMBI-CARD AND METHOD FOR MAKING THE SAME

This application is a US national stage of International Application No. PCT/KR2005/001828, filed 15 Jun. 2005, published on 29 Dec. 2005 with number WO 2005/124672 A1, said international patent application claiming the benefit of Korean Utility Model Patent Application No. 10-2004-0044655, filed 16 Jun. 2004, each hereby incorporated by reference herein.

TECHNICAL FIELD

The present invention relates to a combinational card (hereinafter, referred to as "combi-card") which can be used in a contact-type or noncontact-type fashion and a method for manufacturing the same. More particularly, this invention relates to a combi-card and a method for making the same, in which an inlay layer on which an antenna terminal made of a coil or conductive fiber is formed and a COB (chip on board) on which ACF (anisotropic conductor film) is applied, are pre-treated by a heating head and the like, the COB is attached to an antenna coil insertion layer, and an upper printing sheet with a protection film, and a lower printing sheet with a protection film, which are cut out to be suitable for the COB shape, are stacked to construct a combi-card.

That is, in the present invention, the antenna coil insertion layer, on which the antenna terminal is formed by a coil contact or a conductive fiber contact, is attached to the COB with ACF coated thereon and the inlay layer on which a dam positioning opening is formed, by pre-treatment using a heating head and the like. The upper printing layer and the upper protection layer, which are cut out to fit the location of the COB to form an opening, are stacked. Downwards, a layer for adjusting an antenna coil thickness, on which a COB dam positioning opening is formed, and a lower printing layer and a lower protection layer are in turn stacked. Then, a stacked sheet body is made from the layers by heat-pressing at a temperature of 140-180° C. and under a pressure of 5-25 kg/cm$^2$, and a complete card body is manufactured by cutting out the stacked sheet body. In the card body of the present invention, excellent adhesion between the card body and the COB is maintained as well as excellent conductivity between the antenna coil terminal or the conductive fiber terminal and the COB terminal can be maintained.

BACKGROUND ART

In general, a smart card includes a contact-type integrated circuit (IC) card in which the data is transmitted and received via contacts exposed on a card surface, and a noncontact-type radio frequency (RF) card in which a built-in antenna coil deals with the data wirelessly.

In recent days, there is a need for a combi-card (combinational card), which can be used for both contact-type and noncontact-type because of its convenient usability and compatibility. The combi-card is provided with both the contacts of the contact-type IC card and the antenna coil of the non-contact-type RF card.

Typically, the combi-card is made of a transparent or opaque synthetic resin sheet such as PVC, ABS, PC, PETG, PET, etc. In the conventional combi-card, a lower protection layer 10, a lower printing layer 20, an antenna coil insertion layer 30 at which an antenna coil is inserted, an upper printing layer 40, and an upper protection layer 50 are sequentially stacked from the lower to the upper surface.

FIG. 1 shows a process for making the conventional combi-card.

As shown in FIG. 1, an antenna coil 31 is first wound along the edge of the antenna coil insertion layer 30, and an antenna terminal 34, which is connected with the antenna coil, is formed on a part of the antenna coil.

After the antenna terminal 34 has been formed, the lower protection layer 10, the lower printing layer 20, the antenna coil insertion layer 30, the upper printing layer 40, and the upper protection layer 50 are sequentially stacked, and then they are heat-pressed, and cut out, to thereby form a layered card body 70.

After the card body 70 has been constructed, an opening 72 is formed at the place where the antenna terminal 34 is located on the card body 70. Thereafter, a conductive viscous adhesive 108 is coated on the antenna terminal 34 exposed to the outside through the opening 72, and then a rectangular COB (Chip on Board) 100, on which an IC chip and its contacts are mounted, is inserted into the opening 72.

After the COB 100 has been inserted into the opening 72, heat and pressure is applied onto the COB 100 so that a Hot-Melt tape 111 which has been treated on the COB 100 is adhered to the card body 70. Simultaneously, as the conductive adhesive 108 is hardened, the antenna terminal 34 of the antenna coil and the contacts 104 of the COB 100 are electrically connected to one another. As a result, a complete combi-card is produced.

However, in the above conventional method, there arises a problem in that, if the bending or torsional force is applied to the combi-card, a crack occurs in the interface of the conductive adhesive 108 and so the contact failure is arisen between the contacts 104 of the COB and the antenna terminal 34 of the card body 70. This is because elongation and modulus of elasticity of material constituting the card, and adhesion of the Hot-Melt tape 111 or the thermosetting adhesive which is used to attach the COB 100 to the card body 70 are insufficient. In addition, this is due to the difference of the physical properties between the antenna terminal 34 and the conductive adhesive 108 which establishes an electrical connection between the antenna terminal 34 and COB contacts 104.

This is the structural problem arisen from a conventional combi-card manufacturing process. The antenna terminal 34, which is embedded in the card body 70, is affected by the physical properties of the card body 70, such as elongation, modulus of elasticity and the like. Also, the COB contacts 104 are affected by the physical property of the base layer 103 of the COB 100. Since the adhesive strength of the Hot-Melt tape 111 or the thermosetting adhesive connecting the two layers is insufficient, and the combi-card deteriorates in its function by aging and fatigue of the conductive adhesive 108, a lot of defective products are created.

Korea Patent No. 10-385660 (issued on May 16, 2003) invented to overcome such problems, discloses a combi-card manufacturing method in which the exterior of the IC chip module is designed largely enough to be built-in the card body, and a stacked sheet suitable for the IC chip module is included therein.

However, in such a prior art, although the IC chip module embedded in the card body effectively, it is necessary that the design and manufacturing of the IC chip module should be specially performed, and all kinds of facilities relating to the IC chip module must be specially fabricated. In addition, since the IC chip module is not adhered by an adhesive, the durability becomes decreased and the manufacturing costs increase.

DISCLOSURE OF INVENTION

Technical Problem

Therefore, it is an object of the present invention to provide a combinational IC card (combi-card), which can overcome the problems occurring in the aforementioned conventional combi-card manufacturing method, augment reliability of the card product that currently have exhibited various failures and lack of durability, and provide the simpler manufacturing process, thereby ensuring low cost and high reliability.

It is another object of the present invention to provide a method of attaching the COB 100 to the card body 70.

Advantageous Effects

According to the combi-card of the present invention, the COB 100 and the antenna coil insertion layer 30 are adhered by a simple way, i.e., ACF. In the conventional way, the adhesive strength has been insufficient, and hence electric conductivity has not been good, whereas in the present invention the adhesive strength of ACF is excellent.

The present invention has an advantageous effect in that owing to excellent adhesive strength, even though the card is deformed such as a bending or distortion, good electrical conductivity can be maintained between the COB contacts and the antenna terminal of conductive fiber.

DESCRIPTION OF DRAWINGS

The above and other objects, features, and advantages of the present invention will become more apparent from the following description when taken in conjunction with the accompanying drawings, in which.

BRIEF DESCRIPTION OF REFERENCE NUMBER

Figure 1:
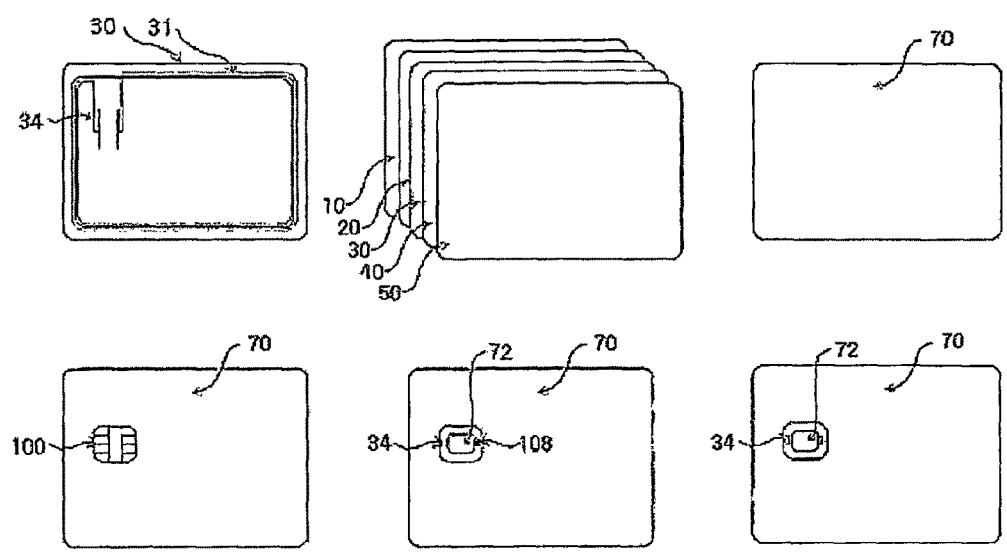
FIG. 1 shows a conventional combi-card manufacturing process.
Figure 2:
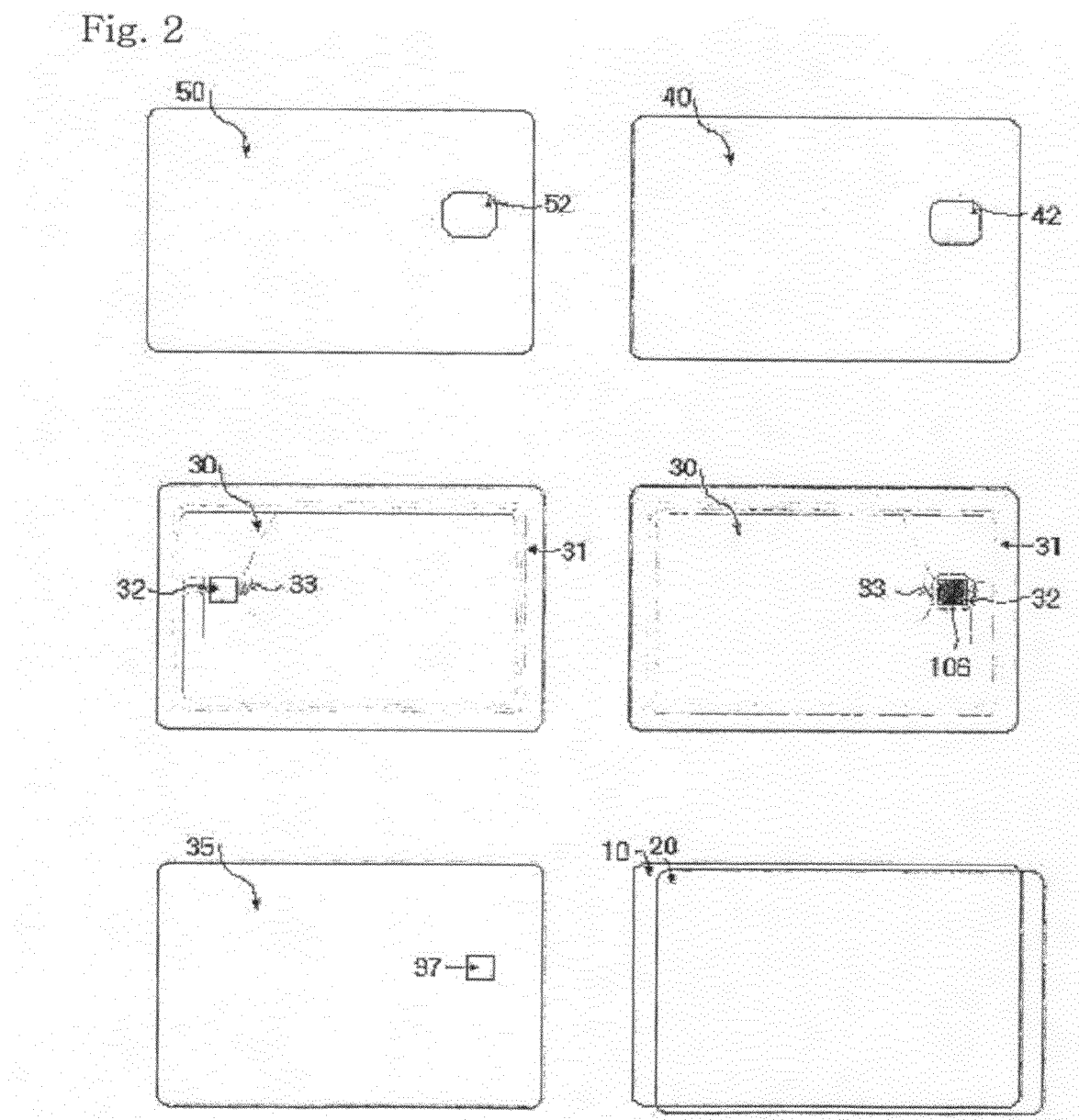
FIG. 2 shows the respective sheet forms necessary for manufacturing the combi-card according to the present invention.

10: lower protection layer 20: lower printing layer
30: antenna coil insertion layer 31: antenna coil
32: positioning opening 33: antenna terminal
33a: structure of a conductive opening
34: antenna coil terminal 35: thickness-adjusting later
37: COB dam positioning opening 40: upper printing layer
42: COB positioning opening formed on upper printing layer
50: upper protection layer
52: COB positioning opening formed op upper protection layer
70: card body 72: opening formed on card body
100: COB(Chip On Board) 101: external contacts of the COB
103: base layer of the COB 104: COB contact
106: dam of the COB 108: conductive adhesive
111: Hot-Melt tape 112: ACF
200: COB assembling die 210: pin bar
220: insertion pit

BEST MODE FOR INVENTION

To achieve the above objects, according to the present invention, there is provided a combi-card comprising: an antenna coil insertion layer, lower and upper printing layers, and lower and upper protection layers, wherein the antenna coil insertion layer includes a conductive fiber antenna terminal, to which a COB contact with ACF coated thereon is directly attached by heat and pressure so that the conductive fiber antenna terminal and the COB contact are electrically connected with each other.

The conductive fiber antenna terminal may be formed in a circular shape of which the diameter, Φ, is 2-5 mm, a rectangular shape which is 2-4 mm wide by 2-4 mm long, or any other various shape of polygons.

In addition, the conductive fiber antenna terminal of the antenna coil insertion layer may be given electric conductivity by using a coil, a metal thin film, etc, and the plurality of sheets may be made of transparent synthetic resin of any one selected from the group consisting PVC, PC, PETG, PET, and ABS.

A method of manufacturing such a combi-card as above is comprised of the following steps of: a step of forming an antenna coil insertion layer, in which a COB insertion pit is formed in an inner surface of a metal die, for a correct positioning of the COB and the antenna coil insertion layer; a round-tipped pin bar is set up on a part of a top and a bottom surfaces of the metal die; the COB is inserted into the pit, so that an ACF pre-treated on the COB faces up; a dam positioning opening, on which the conductive fiber antenna terminal is formed, of the antenna coil insertion layer is aligned to be at regular position by using the pin bar; the COB is provisionally attached to the antenna coil insertion layer, by applying heat and pressure to the COB via the COB insertion pit, so that the ACF-applied COB contact is directly adhered to and electrically connected with the conductive fiber antenna terminal directly; a step of forming a stacked sheet body, in which an upper printing layer and an upper protection layer are stacked on the COB in the antenna coil insertion layer formed by the above step; a layer for adjusting the antenna coil thickness, which is appropriate to the thickness of the dam, a lower printing layer, and a lower protection layer are aligning under the antenna coil insertion layer; the stack-wise positioned layers are so fixed as not to move, by removing the static electricity; the respective layers are provisionally adhered by using a heating iron; and the provisionally adhered structure are put between polished plates of a laminator, and heat and pressure are applied to the structure so as to form a complete stacked sheet body; and a step of cutting out external contacts of the COB from the stacked sheet body, using a cutting machine.

In addition, a method of manufacturing the combi-card comprises the steps of: sequentially stacking a lower protection layer, a lower printing layer, a layer for adjusting the antenna coil thickness, on which a COB dam positioning opening is formed, an antenna coil insertion layer, on which the COB dam positioning opening and a conductive fiber antenna terminal are formed, an upper printing layer on which a COB positioning opening is formed, and an upper protection layer, on which a COB positioning opening is formed; removing the air and the static electricity between the respective layers by using a roller; inserting a COB, on which an ACF is pre-treated, into the opening to which the COB will be secured; attaching an ACF-applied COB contact to the conductive fiber antenna terminal by applying heat and pressure, to establish electric connection between the ACF-applied COB contact and conductive fiber antenna terminal; provisionally partially adhering the antenna coil insertion sheet to certain portions of the sheet of the card body, by applying heat and pressure; putting the provisionally adhered structure between polished plates of a laminator, and applying heat and pressure so as to form a complete stacked sheet body; and cutting out external contacts of the COB from the stacked sheet body, using a cutting machine.

The upper and lower printing layers are 100-200 μm thick, the antenna coil insertion layer is 100-250 μm thick, the layer for adjusting the antenna coil thickness is 100-250 μm thick, and the upper and lower protection layers are 50-100 μm thick. To form a complete stacked sheet body, the heat of 140-180° C. and the pressure of 60-170 bar is applied to the laminated structure.

In the above method, the diameter of the pin bar is 5 mm or less and its height is 5 mm or less, and the COB insertion pit is polyhedrally formed at a depth of 160-230 μm. Also, the COB is adhered to the antenna coil insertion layer, by applying heat and pressure to the COB via the COB insertion pit.

The stacked sheet body means a structure that stacked sheets are laminated from plastic sheets by applying heat and pressure to the sheets.

Hereinafter, the present invention will be described in detail with reference to the attached drawings.

Here, the same elements of the present invention as the conventional elements will be denoted by the same reference numerals and symbols.

First, the respective layers constituting the card body 70 will be discussed.

There is an upper protection layer 50 in which a COB positioning opening 52 is formed, and therebeneath is disposed an upper printing layer 40 in which an opening 42 is formed.

A conductive fiber antenna terminal 33 in an antenna coil insertion layer 30, on which an RF functional antenna coil 31 is mounted, is attached by ACF 112. The attaching process is as follows.

ACF 112 is provisionally pre-treated on the COB 100 by using a heating head and the like, and the COB is cut out. Then, the COB 100 is held in position onto a COB insertion pit 220 of a COB assembling die 200 in FIG. 9, and is upside down so that the ACF 112 faces up. Thereafter, the antenna coil insertion layer 30 having a dam positioning opening 32, through which a dam 106 of the COB 100 is penetrated, is aligned. By applying heat and pressure via a COB insertion pit 72, a COB contact 104 with ACF 112 coated thereon is conductively adhered to the conductive fiber antenna terminal 33 of the antenna coil insertion layer 30 by the ACF 112, and then a sheet for antenna coil insertion is completed.

To the inside of the conductive fiber antenna terminal 33 of the antenna coil insertion layer 30, may be added any conductive material such as a coil, a metal thin film, etc. However, taking into consideration of reliability, the conductive fiber antenna terminal 33 is most preferable for the conductive material.

Like this, the antenna terminal 33 of the antenna coil insertion layer 30 is provided with a conductive fiber and is given electric conductivity. According to the workability and the easiness of heat pressing, such an antenna terminal may be formed of a circular shape whose diameter, Φ, is 2-5 mm, a rectangular shape which is 2-4 mm wide by 2-4 mm long, or other geometric shapes.

Under the antenna terminal 33, a layer for adjusting an antenna coil thickness 35, on which a COB chip positioning opening 37 is formed, is appropriately positioned, and in turn the lower printing layer 20 and the lower protection layer 10 is positioned.

Then, the respective stacked sheets are fixed by a certain tool so as not to be shaken and moved, and fixedly adhered to one another by heat and the like. Thereafter, the stacked sheets are formed integrally with one another by applying proper heat and pressure to form a stacked structure, which will be cut out at regular position, to complete the combi-card.

Figure 4:
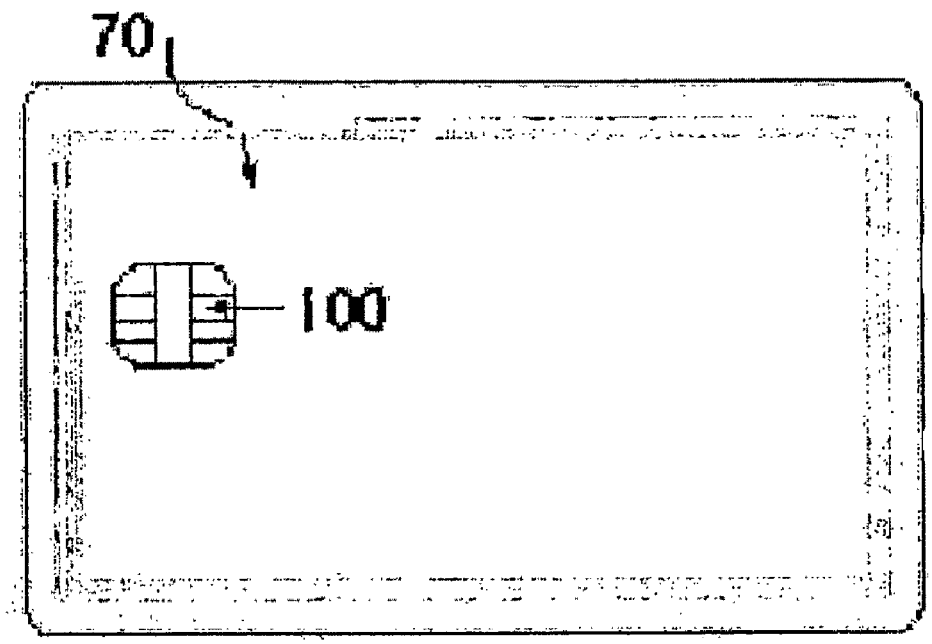
FIG. 4 is a plan view of a combi-card according to the present invention.

FIG. 4 shows a plan view of the card manufactured by the above process.

Again, the combi-card is characterized in that it is manufactured by applying ACF 112 to connect or attach the COB 100 and its contacts 104 to the antenna coil insertion layer 30 and the conductive fiber antenna terminal 33, and to give them the electrical conductivity.

Figure 5:
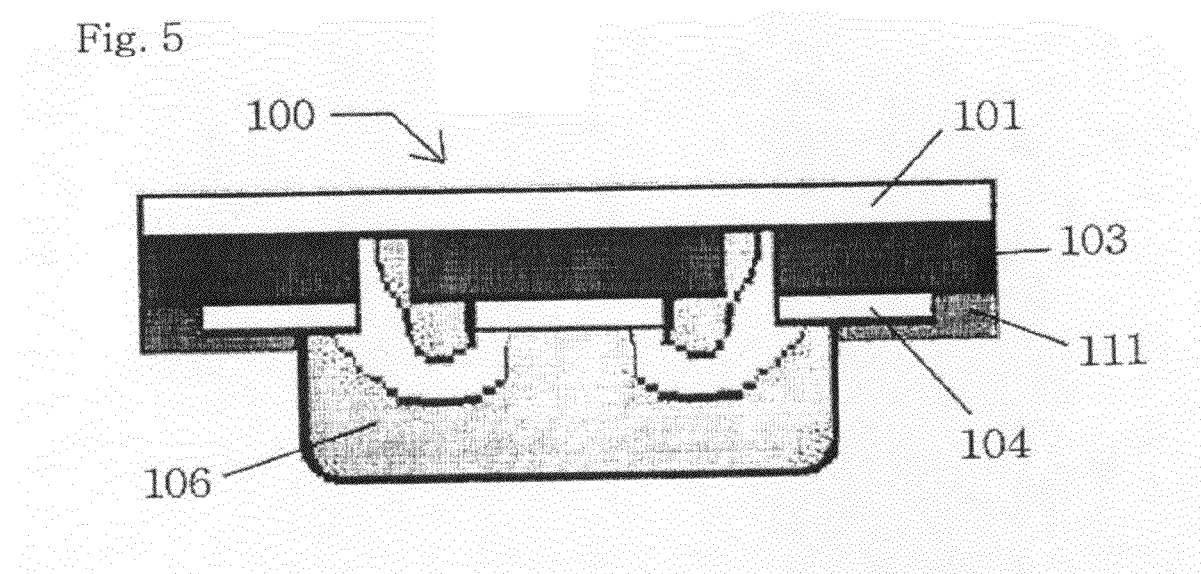
FIG. 5 is a cross-sectional view showing the attachment of the COB and the Hot-Melt tape in FIG. 1 of the conventional manufacturing process.

In the conventional manufacturing process, as shown in FIG. 5, after the Hot-Melt tape 111 has been provisionally coated on the COB 100 by a heating head, etc., the COB contacts 104 and the antenna terminal 33 are directly attached by means of thermo compression bonding or soldering. Thereafter a sheet on which the COB positioning opening is formed is aligned at regular position, and then heat-pressed to make a stacked sheet. The card was completed by cutting out the stacked sheet at regular position.

Figure 6:
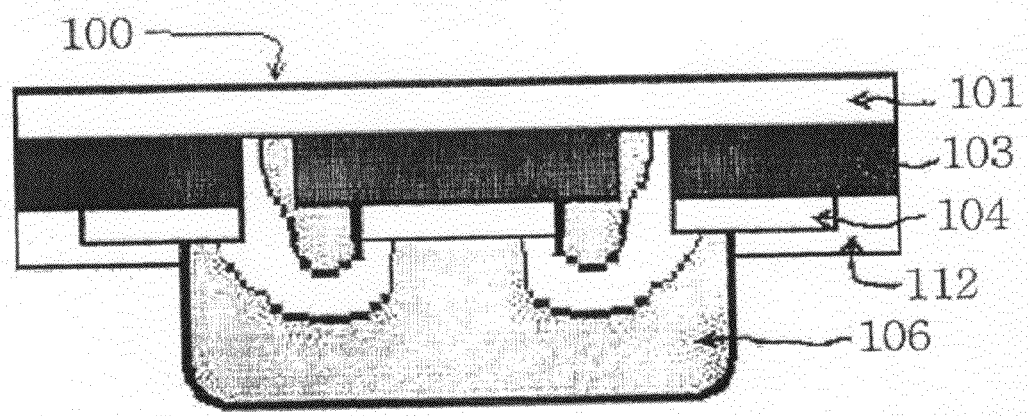
FIG. 6 is a cross-sectional view showing the pre-treatment of ACF on the COB according to the present invention.

In the present invention, the first process for constructing the combi-card is shown in FIG. 6. As shown in FIG. 6, ACF 112 is provisionally pre-treated on the COB 100 by using a heating head and the like. Then, the COB 100 is held in position onto a COB insertion pit 220 of a COB assembling die 200 (shown in FIG. 9), and is upside down so that the ACF 112 faces up. Thereafter, the antenna coil insertion layer 30 having a dam positioning opening 32 (shown in FIG. 7), through which a dam 106 of the COB 100 is penetrated, is aligned. By applying heat and pressure, a COB contact 104 with ACF 112 coated thereon is conductively adhered to the conductive fiber antenna terminal 33 of the antenna coil insertion layer 30 by the ACF 112, and then a sheet for antenna coil insertion is completed.

To the inside of the antenna terminal 33 of the antenna coil insertion layer 30, may be added any conductive material such as a coil terminal 34, a conductive fiber antenna terminal 33, a metal thin film, etc. However, taking into consideration of reliability, the conductive fiber antenna terminal 33 was most excellent for the conductive material.

Under the antenna terminal 33, a layer for adjusting an antenna coil thickness 35, on which a COB chip positioning opening 37 is formed, is appropriately positioned, and in turn the lower printing layer 20 and the lower protection layer 10 is positioned. Then, the respective stacked sheets are fixed by a tool so as not to be shaken and moved, and fixedly adhered to one another by heat and the like. Thereafter, the stacked sheets are formed integrally with one another by applying proper heat and pressure to form a stacked structure, which will be cut out at regular position, to complete the combi-card.

In the card body 70 for the combi-card of the present invention, the upper and lower printing layers 40 and 20, the antenna coil insertion layer 30 on which the antenna coil 31 is formed, and the upper and lower protection layers 50 and 10 are made of a transparent or opaque plastic material, such as PVC, PC, PETG, PET, ABS, etc.

The structure of the present invention is characterized in that, since sufficient heat and pressure is applied and so the adhesive strength of ACF 112 can be excellent, the chip would rather be broken than be detached from the card, and it exerts excellent electrical conductivity. On the contrary, in the conventional attachment process using a milling method, the sufficient adhesive strength could not be expected because of the short adhering time.

Figure 9:
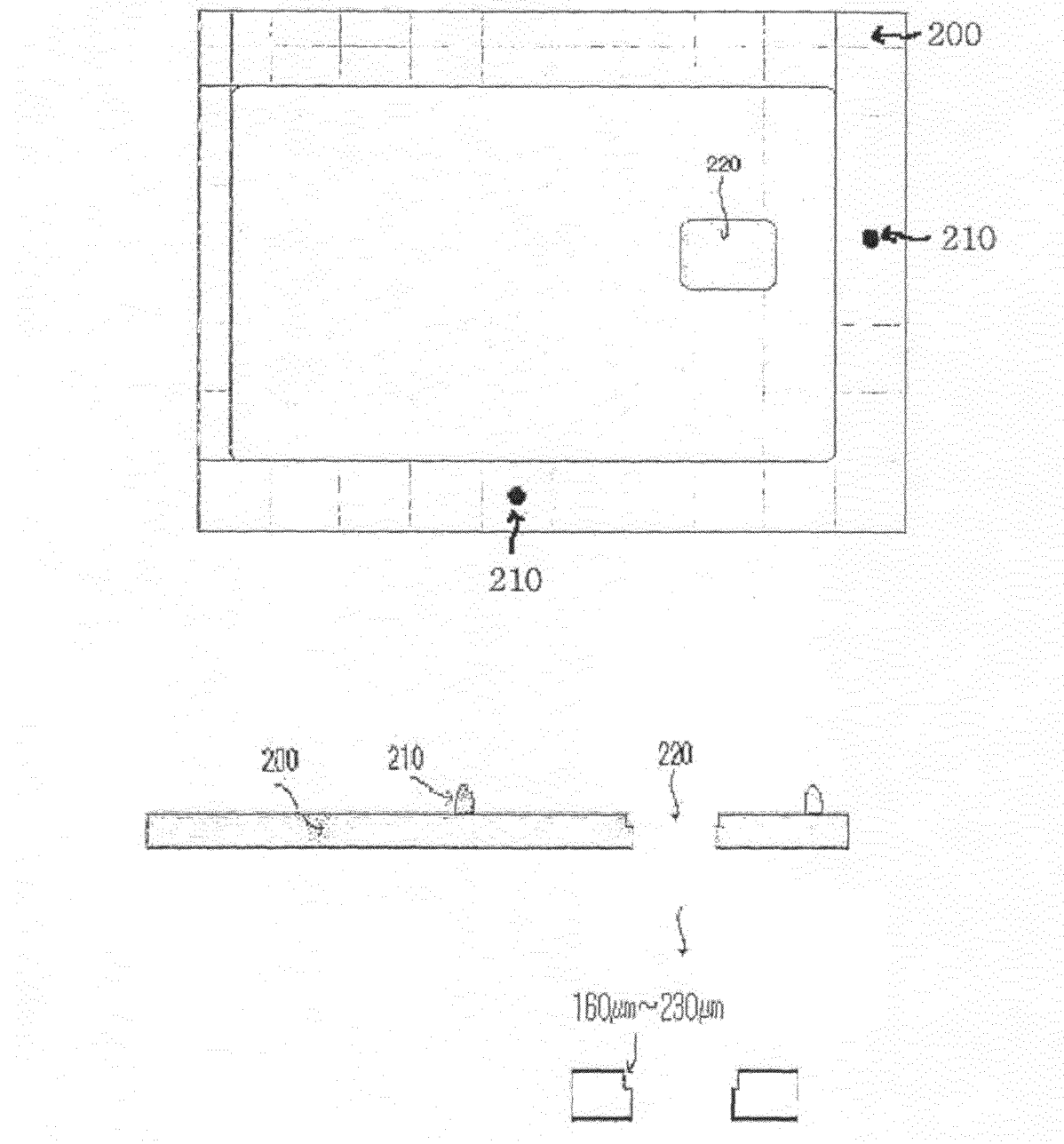
FIG. 9 is a plan view and side view of an embodiment for a COB assembling die of the present invention.

For a correct positioning of the COB 100 and the antenna coil insertion layer 30, like in FIG. 9, a round-tipped pin bar 210, whose diameter is 5 mm or less and height is 5 mm or less, is set up on the metal die 200, and a COB-shaped pit 220 is formed on a surface of the die 200 at a depth of 160-230 μm. The COB 100 is inserted into the pit 220, so that the ACF 112 pre-treated on the COB 100 can face up.

Figure 7:
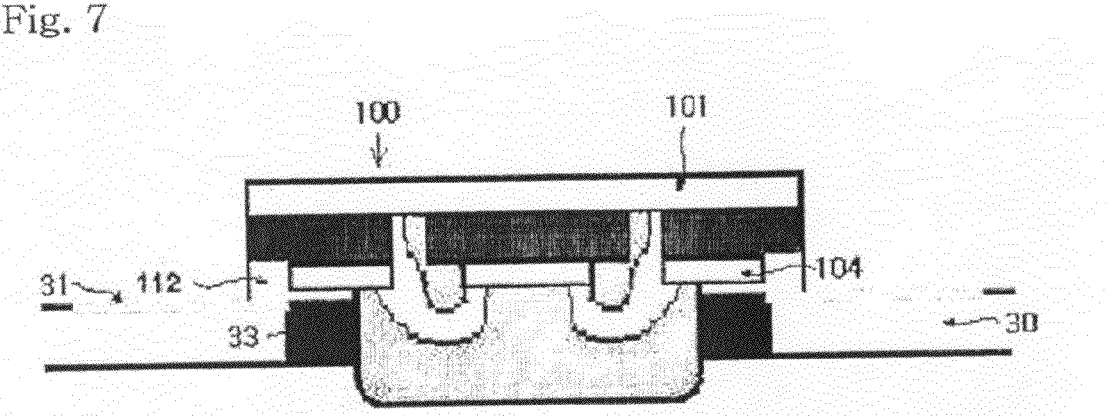
FIG. 7 is a cross-sectional view showing an embodiment for a sheet for antenna coil insertion to which the COB and the antenna coil insertion layer are adhered, according to the present invention.
Figure 8:
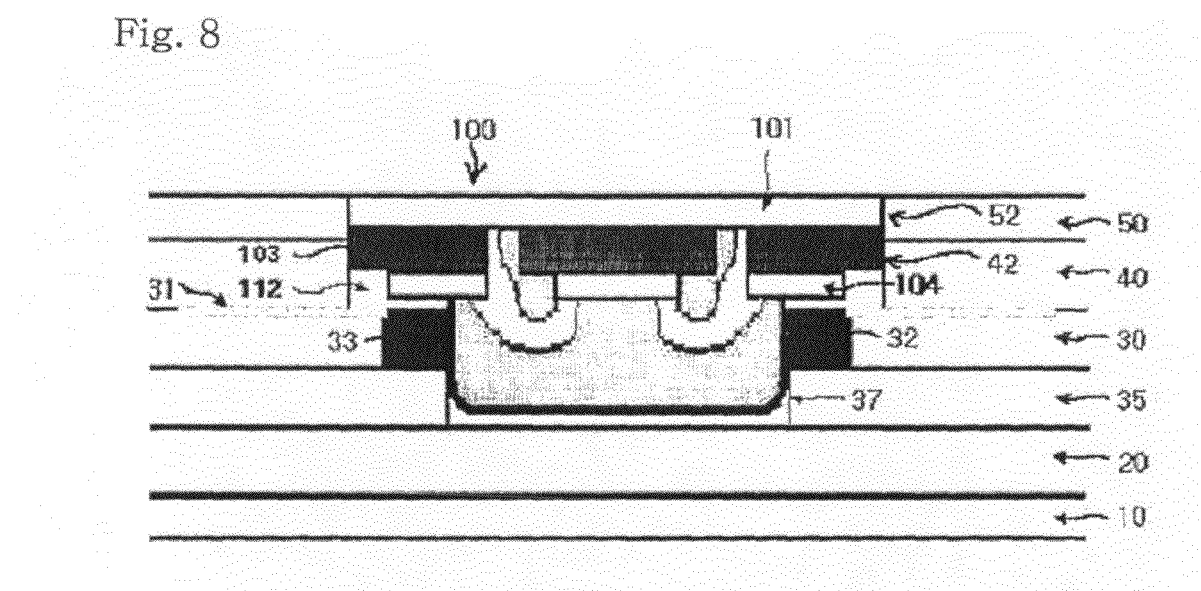
FIG. 8 is a cross-sectional view showing an embodiment for stack-wise assembly of the COB and the respective sheet layers, according to the present invention.

Then, the dam positioning opening 32 of the antenna coil insertion layer 30 is aligned by using the pin bar 210, and thereafter, by applying heat and pressure via the pit 220, the COB 100 is provisionally adhered to the antenna coil insertion layer 30, which is 100-250 μm thick and on which the conductive fiber antenna terminal 33 is formed. By doing so, the sheet for antenna coil insertion, in which the ACF-applied COB contact 104 is adhered and electrically connected to the conductive fiber antenna terminal 33 directly, is formed as is shown in FIG. 7.

The upper printing layer 40 which is 100-200 μm and the upper protection layer 50 which is 50-100 μm are in turn positioned on the provisionally adhered sheet for antenna coil insertion; and the antenna coil thickness-adjusting layer 35, which is 100-250 μm thick, appropriate to the thickness of the dam 106, the lower printing layer 20, which is 100-200 μm thick, and the lower protection layer 10, which is 50-100 μm thick, are in turn positioned under the provisionally adhered sheet for antenna coil insertion. The stacked sheets are so fixed as not to move by removing the static electricity, and then the respective layers are provisionally point-wise adhered by using a heating iron and the like. Thereafter, the provisionally adhered structure is put between polished plates of a laminator, and is formed to a complete stacked sheet by applying the heat of 140-180° C. and the pressure of 60-170 bar.

Finally, the external contacts 101 of the COB 100 is cut out, so that their positions can meet the ISO7816-2 or KSX6507-2 requirements (both of which are for "the dimension and position of contacts"). As a result, the combi-card having excellent durability and electric conductivity is manufactured.

Hereafter, the preferred embodiments of the present invention will be described in detail. However, the scope of the present invention is not limited to these embodiments.

Embodiment 1

For a correct positioning of the COB 100 and the antenna coil insertion layer 30, as in FIG. 9, the respective two round-tipped pin bars 210 (each diameter is 5 mm or less and height is 5 mm or less) are set up on the top and bottom surfaces of the metal die 200, and the COB-shaped pit 220 is formed on a surface of the die 200, at a depth of 160-230 μm. The COB 100 is inserted into the pit 220, so that the ACF 112 pre-treated on the COB 100 can face up. Then, the dam positioning opening 32 of the antenna coil insertion layer 30, which is 100-250 μm thick and on which the conductive fiber antenna terminal 33 is formed, is aligned by using the pin bars 210, and thereafter, by applying heat and pressure, the COB 100 is provisionally adhered to the antenna coil insertion layer 30. By doing so, the sheet for antenna coil insertion, in which the ACF-applied COB contact 104 is adhered and electrically connected to the conductive fiber antenna terminal 33 directly, is formed as is shown in FIG. 7.

The upper printing layer 40 which is 100-200 μm and the upper protection layer 50 which is 50-100 μm are in turn positioned on the provisionally adhered sheet for antenna coil insertion as above; and the antenna coil thickness-adjusting layer 35, which is 100-250 μm thick, appropriate to the thickness of the dam 106, the lower printing layer 20, which is 100-200 μm thick, and the lower protection layer 10, which is 50-100 μm thick, are in turn positioned under the provisionally adhered sheet for antenna coil insertion. The stacked sheets are so fixed as not to move by removing the static electricity, and then the respective layers are provisionally point-wise adhered by using a heating iron and the like. Thereafter, the provisionally adhered structure is put between the polished plates of the laminator, and is formed to a complete stacked sheet by applying the heat of 140-180° C. and the pressure of 60-170 bar.

After the stacked sheet has been formed, the respective contacts of the external contacts 101 of the COB 100 are cut out, so that their positions may meet the ISO7816-2 or KSX6507-2 requirements (both of which are for "the dimension and position of contacts"). As a result, the combi-card having excellent durability and electric conductivity is manufactured.

Embodiment 2

Figure 3:
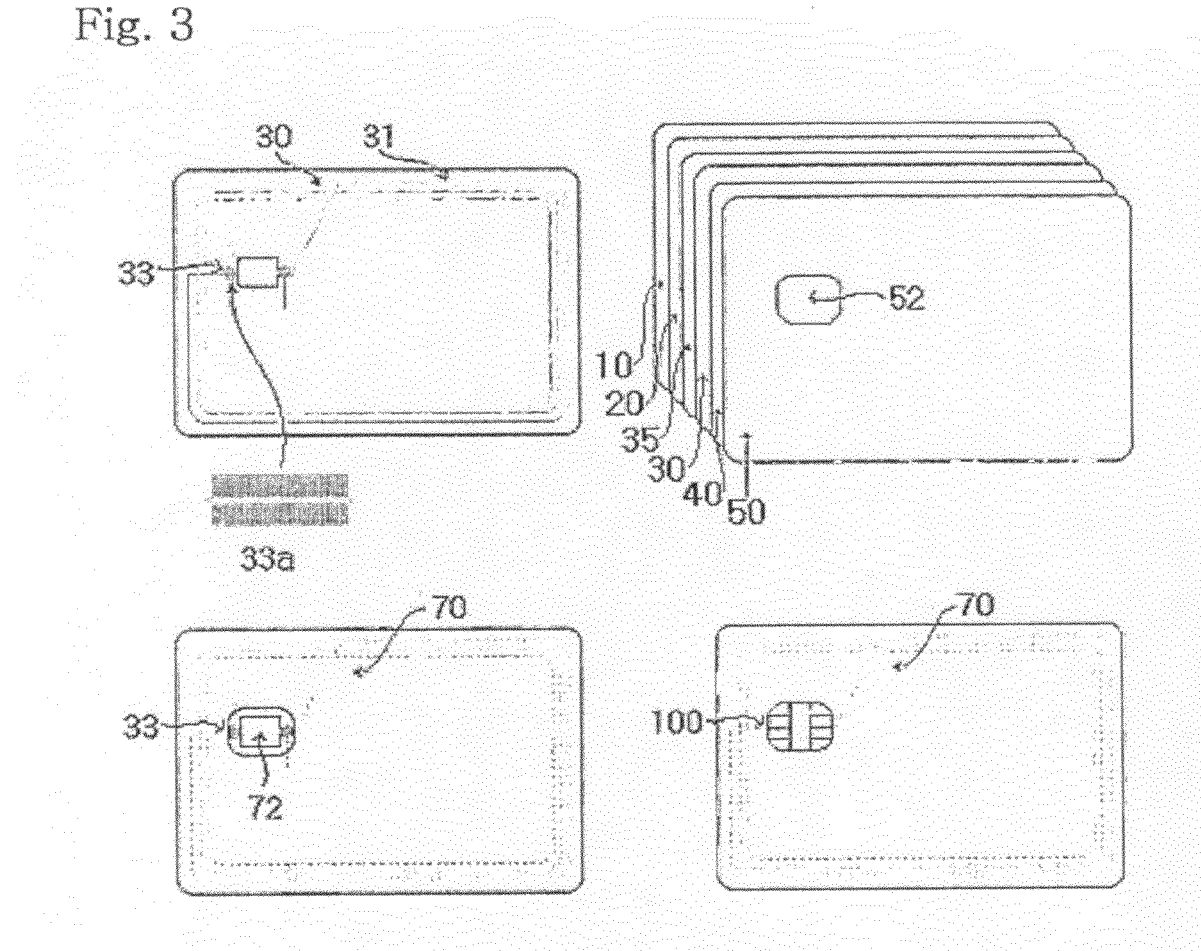
FIG. 3 shows the combi-card manufactured by the layered structure of the present invention.

As shown in FIG. 3, the lower protection layer 10, which is 50-100 μm thick; the lower printing layer 20, which is 100-200 μm thick; the antenna coil thickness-adjusting layer 35, which is 100-250 μm thick and on which the COB dam positioning opening 37 is formed; the antenna coil insertion layer 30, which is 100-200 μm thick and on which the COB dam positioning opening 32 and the conductive fiber antenna terminal 33 are formed; the upper printing layer 40 which is 100-200 μm thick and on which the COB positioning opening 42 is formed; and the upper protection layer 50 which is 50-100 μm thick and on which the COB positioning opening 52 is formed, are in turn stacked upward. After the air and the static electricity between the respective layers has been removed by a roller, the COB 100, on which the ACF 112 is pre-treated, is inserted into the opening 72 to which the COB 100 will be secured. Then, by applying heat and pressure, the ACF-applied COB contact 104 is adhered and electrically connected to the conductive fiber antenna terminal 33 directly. At this time, the sheet for antenna coil insertion is partially provisionally adhered to certain portions of the sheet of the card body 70, by the heat and pressure.

Thereafter, the provisionally adhered structure is put between the polished plates of the laminator, and is formed to a complete stacked sheet by applying the heat of 140° C.-180° C. and the pressure of 60-170 bar.

After having been formed, the stacked sheet is cut out, so that the positions of the external contacts 101 of the COB 100 may meet the ISO7816-2 or KSX6507-2 requirements (both of which are for "the dimension and position of contacts"). As a result, the combi-card having excellent durability and electric conductivity is manufactured.

The invention claimed is:

1. A combi-card including a plurality of stacked sheets, comprising:
   a card body including an antenna coil insertion layer, lower and upper printing layers, and lower and upper protection layers;
   a thickness-adjusting layer formed under the antenna coil insertion layer;
   a first chip on board dam positioning opening, in which a conductive fiber antenna terminal including an antenna terminal therein is set, and a second chip on board dam positioning opening, are formed in one side of the antenna coil insertion layer and the thickness-adjusting layer; and
   chip on board positioning openings formed in, respectively, the upper protection layer and the upper printing layer positioned above the antenna coil insertion layer, and a chip on board is set thereon,
   wherein the plurality of sheets are made of transparent synthetic resin of any one selected from the group consisting of PVC, PC, PETG, PET, and ABS,
   the conductive fiber antenna terminal of the antenna coil insertion layer is given electric conductivity by using a coil or a metal thin film,
   wherein the conductive fiber antenna terminal is directly attached by heat and pressure to a chip on board contact with an anisotropic conductor film coated thereon so that the conductive fiber antenna terminal and the chip on board contact are electrically connected with each other,
   and wherein the anisotropic conductor film provides an adhesive strength to the chip on board such that a failure strength of the chip on board is less than a force required to detach the chip on board from the card body.

* * * * *